United States Patent
Zahniser

(10) Patent No.: US 7,360,357 B2
(45) Date of Patent: Apr. 22, 2008

(54) HYDRAULIC STEERING SYSTEM WITH INPUT HORSEPOWER LIMITING CIRCUIT AND INCREASED FAN SPEEDS AT LOW ENGINE RPM

(75) Inventor: John C. Zahniser, New Wilmington, PA (US)

(73) Assignee: Parker-Hannifin Corporation, Cleveland, OH (US)

( * ) Notice: Subject to any disclaimer, the term of this patent is extended or adjusted under 35 U.S.C. 154(b) by 41 days.

(21) Appl. No.: 11/368,579

(22) Filed: Mar. 6, 2006

(65) Prior Publication Data

US 2006/0196720 A1  Sep. 7, 2006

Related U.S. Application Data

(60) Provisional application No. 60/659,315, filed on Mar. 7, 2005.

(51) Int. Cl.
   *B60K 11/04* (2006.01)
   *B60K 25/04* (2006.01)
(52) U.S. Cl. .......................... 60/421; 60/456
(58) Field of Classification Search ............... 60/421, 60/428, 456; 91/516, 532
   See application file for complete search history.

(56) References Cited

U.S. PATENT DOCUMENTS

| | | | | |
|---|---|---|---|---|
| 4,798,050 A | * | 1/1989 | Nakamura et al. | 60/428 |
| 5,398,505 A | * | 3/1995 | Oogushi et al. | 91/532 |
| 5,875,630 A | * | 3/1999 | Walsh et al. | 60/421 |
| 5,950,431 A | * | 9/1999 | Oogushi | 60/486 |
| 5,960,628 A | * | 10/1999 | Machesney et al. | 91/516 |
| 6,016,657 A | | 1/2000 | Buschur | |
| 6,311,488 B1 | * | 11/2001 | Maruta et al. | 60/456 |
| 6,629,411 B2 | | 10/2003 | Buscher et al. | |
| 6,681,568 B2 | * | 1/2004 | Smith | 60/456 |
| 7,155,907 B2 | * | 1/2007 | Desjardins et al. | 60/420 |
| 2005/0217260 A1 | | 10/2005 | Desjardins et al. | |

FOREIGN PATENT DOCUMENTS

JP    06066141 A  *  3/1994
JP    07266916 A  *  10/1995

OTHER PUBLICATIONS

RD 363036 A Jun. 1994.*

* cited by examiner

*Primary Examiner*—Thomas E. Lazo
(74) *Attorney, Agent, or Firm*—Renner, Otto, Boisselle & Sklar, LLP

(57) ABSTRACT

A hydraulic system that provides hydraulic fluid to a power steering system of a vehicle at a substantially constant flow rate and can also divert excess hydraulic fluid to the air cooling fan of an associated vehicle at low engine speeds is disclosed. The resulting hydraulic system increases fan speed and increases cooling at low engine speeds while also limiting the input horsepower to one or more driving pumps based at least in part on the outlet pressure of the hydraulic pump unit.

22 Claims, 2 Drawing Sheets

HYDRAULIC STEERING SYSTEM WITH INPUT HORSEPOWER LIMITING CIRCUIT AND INCREASED FAN SPEEDS AT LOW ENGINE RPM

RELATED APPLICATION DATA

This application claims the benefit of U.S. Provisional Application No. 60/659,315 filed Mar. 7, 2005, which is incorporated herein by reference.

FIELD OF THE INVENTION

The present invention relates generally to hydraulic and hydraulic systems for vehicles and, more specifically, to a hydraulic system for operating a power steering system and for driving a cooling fan motor.

BACKGROUND OF THE INVENTION

Hydraulic fluid for a power steering unit is generally delivered by a constant flow rate pump. Fluid flow continues at the prescribed volumetric rate, regardless of system back pressure, so long as the pump is able to deliver the fluid at the prescribed rate. With this constant flow demand there exist risks of pump damage. Therefore pumps for such systems generally are provided with one or more pressure relief mechanisms that terminate the pumping action in case of excessive system loads. The pressure relief mechanisms generally avoid damage to the pump at the expense of temporary impairment of power steering and temporary loss of service from anything else which may be powered by the pump (e.g. driving a cooling fan motor). In many instances, bypass mechanisms are provided around individual components of the system, so as to avoid loss of the entire system when a localized abnormality or overload is experienced.

Proper pump design calls for a hydraulic pump to have only the ability to supply the normal hydraulic fluid needs of the devices which it is serving. If a plurality of devices are being served, it is desirable that they share the hydraulic fluid on some basis of priority. Power steering is clearly a matter of high priority. So long as a power steering unit is operating normally, its needs for hydraulic fluid should receive preferred treatment.

A cooling fan performs an essential function in protecting the automotive engine from overheating. However, the fan operation may be temporarily halted without serious risk to the motor vehicle or to its passengers. Therefore, a cooling fan generally operates in conjunction with a power steering unit on a lower priority basis. In such cases, if the load on the pump becomes excessive, then the needs of the cooling fan may be sacrificed.

Pump performance is generally dependent on engine speed, which is generally expressed in revolutions per minute (RPM). At high engine speed, the hydraulic pump generally produces an output sufficient to provide hydraulic fluid flow for the power steering system and the cooling fan. At lower engine speeds there is generally insufficient hydraulic fluid flow to support both the power steering system and the cooling fan. In many cases, while there is insufficient hydraulic fluid flow at lower engine RPM, there is generally sufficient secondary flow from the priority valve supplying the power steering system to supplement the cooling fan.

SUMMARY OF THE INVENTION

The invention relates to a hydraulic system that can provide hydraulic fluid to a power steering system of a vehicle at a substantially constant flow rate and can also divert excess hydraulic fluid to the air cooling fan of an associated vehicle at low engine speeds, thereby increasing fan speed and increasing cooling at low engine speeds.

According to one aspect of the invention, there is provided a hydraulic system for use in a vehicle comprising a hydraulic pump unit including first and second fixed displacement pumps and a common drive shaft to drive each of the pumps; a priority valve having an input fluidly connected to the hydraulic pump, a primary output and a secondary output, wherein the primary output is fluidly connected to the power steering system of an associated vehicle to provide a substantially constant flow of hydraulic fluid to the power steering system, and wherein the secondary output is selectably fluidly connected to a hydraulic motor for a cooling fan of the associated vehicle.

According to another aspect of the invention, there is provided a method for increasing fan speed in a hydraulic system, the method comprising driving first and second fixed displacement pumps having a common drive shaft to each of the pumps with an associated engine; fluidly connecting a priority valve having an outlet of at least one of the first and second pumps, wherein the priority valve includes a primary output and a secondary output, wherein the primary output is fluidly connected to the power steering system of an associated vehicle to provide a substantially constant flow of hydraulic fluid to the power steering system, and wherein the secondary output is selectably fluidly connected to a hydraulic motor for a cooling fan of the associated vehicle.

According to a further aspect of the invention, there is provided a hydraulic system for use in a vehicle comprising a hydraulic pump unit including first and second fixed displacement pumps and a common drive shaft to drive each of the pumps; priority valve having an input fluidly connected to the hydraulic pump, a primary output circuit and a secondary output circuit, wherein the primary output circuit provides hydraulic fluid to the power steering system of an associated vehicle, and wherein the secondary output circuit provides hydraulic fluid to a hydraulic motor for a cooling fan of the associated vehicle when the vehicle engine speed is substantially at or below a predetermined speed.

According to further aspect of the invention, there is provided a method for limiting input horsepower, the method comprising: driving first and second fixed displacement pumps having a common drive shaft to each of the pumps with an associated engine; sensing hydraulic pressure output from each of the first and second displacement pumps with at least one pressure transducer; outputting a signal form the at least one pressure transducer to a controller; controlling a proportional pressure relief valve having a first end fluidly connected to a fan motor; wherein the proportional pressure relief valve limits hydraulic pressure supplied to the fan motor based at least in part hydraulic pressure output from each of the first and second displacement pumps.

The foregoing and other features of the invention are hereinafter more fully described and particularly pointed out in the claims, the following description and the annexed drawings setting forth in detail illustrative embodiments of the invention, such being indicative, however, of but a few of the various ways in which the principles of the invention may be employed.

DETAILED DESCRIPTION

The present invention relates to a hydraulic system for providing hydraulic fluid to a power steering system of a vehicle and diverting excess flow from the power steering system to the hydraulic motor of a cooling fan at low engine speeds. At or below a predetermined speed, the diverted excess flow of hydraulic fluid to the hydraulic motor will increase fluid flow to the cooling fan, which in turn will increase the fan speed, thereby increasing cooling at low engine speeds.

Figure 1:
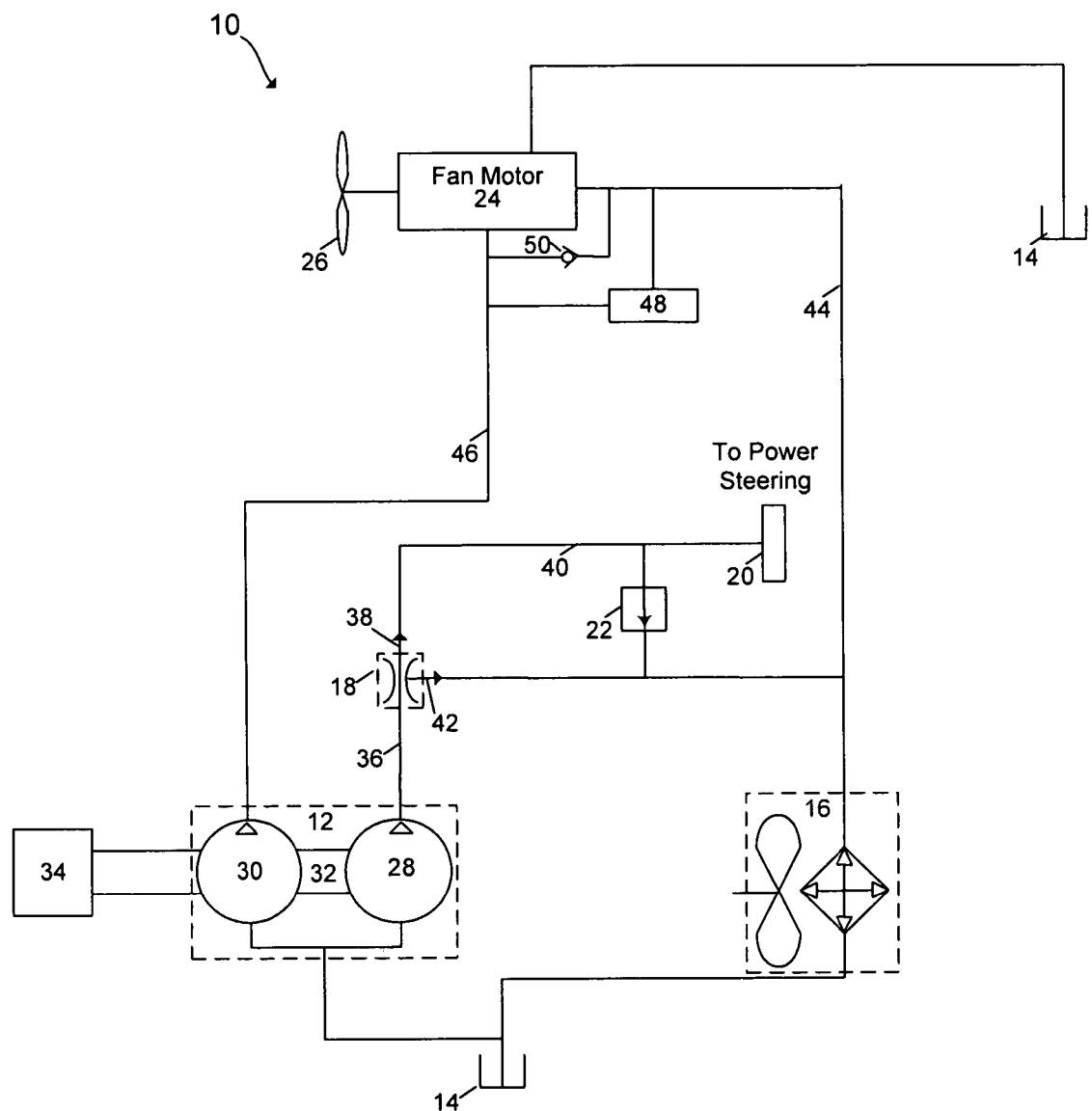
FIG. 1 is an exemplary prior art schematic diagram of a hydraulic system.

Referring to FIG. 1, a prior art hydraulic system 10 is shown. The hydraulic system 10 is a common system that can be found on an assortment of vehicles, including, for example, buses, trucks, etc. The system 10 generally consists of a hydraulic pump unit 12, a hydraulic fluid reservoir 14, a cooling unit 16, a priority valve 18, a power steering system 20, a relief valve 22, a hydraulic motor 24 and a cooling fan 26.

The input of the hydraulic pump unit 12 is connected to the outlet of the hydraulic fluid reservoir 14. The hydraulic pump unit 12 is a tandem or double pump unit 26 that can be of any standard construction. The hydraulic pump unit 12 generally includes a first fixed displacement pump 28 and a second fixed displacement pump 30. The two pumps are driven by a common drive shaft 32 that can be driven by the main motor 34 of the vehicle. The main motor 34 can be any suitable motor that may be commonly used in a bus or truck.

The shaft 32 typically rotates a pump gear (not shown) in each of the pumps. Although the first and second pumps 28 and 30 could be pumps of the same size and displacement one of the pumps may have a larger displacement than the other and, in particular, in the illustrated hydraulic circuit, the pump 28 for example, may be larger than the second pump 30. The sizes of the pumps actually used will vary and depend on the power requirements of the hydraulic system of the vehicle including the requirements of the vehicle's fan motor, vehicle's power steering requirements, and any other hydraulic subsystems the pump is expected to drive. For purposes of the following discussion, the first pump 28 may be referred to herein as the primary pump while the second pump 30 may be referred to as the secondary pump.

As shown in FIG. 1, the output of the first pump 28 is connected by hydraulic line 36 to a priority valve 18. The priority valve 18 has a primary output 38 that is generally selected to provide a constant flow of hydraulic fluid through hydraulic line 40 to the power steering unit 20 of the vehicle. With respect to the operation of the priority valve 18, it will be appreciated that the operation of this valve is automatic and is controlled by hydraulic pressure. The priority valve 18 generally measures the difference in pressure and compares it to the value of a spring mounted in the valve. In this way it is able to limit the fluid flow to the power steering system. The priority valve 18 further includes a secondary output 42 that generally routes excess hydraulic fluid supplied to the priority valve 18 to the hydraulic fluid reservoir 14 through cooling unit 16 by hydraulic line 44.

In order to protect the power steering unit 20 from excess hydraulic fluid pressure, a relief valve 22 is generally provided. When excessive hydraulic fluid pressure develops along hydraulic line 40, which is input to the power steering unit, relief valve 22 opens to relieve the excess hydraulic fluid pressure. The relief valve 22 re-routes the excessive hydraulic fluid through the cooling unit 16 and returns the hydraulic fluid to the hydraulic fluid reservoir 14. One of ordinary skill in the art will readily appreciate that the maximum pressure at which the relief valve 22 provides relief may vary depending upon the particular power steering unit.

The second pump 30 generally provides hydraulic fluid through hydraulic line 46 to the fan motor 24. The fan motor 24, in turn, operates the cooling fan 26. The speed of the fan motor 24 may be controlled and limited by a proportional control valve 48. The proportional control valve 48 is connected between hydraulic line passageways 44 and 46. The proportional control valve 48 can be a standard valve of this type. For example the proportional control valve 48 may be a Parker proportional control valve Model No. ERA121C30 having a rating of 3900 pounds per square inch (PSI). The valve 48 may be controlled and operated by a programmed electronic controller (not shown) that measures variables from the vehicle to determine the appropriate fan speed to optimize cooling capability. The controller may be a separate or dedicated controller connected to the terminals of the proportional control valve 48 or the electronic controller can be incorporated into or part of another form of electronic control such as an engine control module (ECM) for the vehicle.

In operation, as the engine speed increases, hydraulic pressure output from the hydraulic pump unit 12 is monitored and the pressure in the fan motor, at proportional relief valve 48, is proportionally set to the pressure output from the hydraulic pump unit 12 in order to keep the input horsepower to hydraulic pump 12 below the maximum allowed by the pump manufacturer. As the pressure on hydraulic pump output to the steering circuit decreases, the pressure on the input section of the hydraulic pump unit 12 will increase allowing the fan to return to full speed.

As shown in FIG. 1, a check valve 50 may also be connected between hydraulic line passageways 44 and 46. A check valve 50 is generally provided to prevent cavitation of the fan motor 24 when the inertia of the system allows the fan motor 24 to function as a pump. As shown in FIG. 1, hydraulic fluid routed through the fan motor 24 may be returned to the hydraulic fluid reservoir 14. Prior to return to the hydraulic fluid reservoir 14, the hydraulic fluid may or may not be cooled by passing the hydraulic fluid through one or more cooling units 16.

The cooling unit 16 can be connected to the hydraulic system of the invention, as shown in FIG. 1. The cooling unit 16 can serve several different functions, including cooling the charged air of the vehicle and the engine coolant. The cooling unit 16 can also be used to cool the hydraulic fluid itself and also possibly transmission coolant. Because the cooling unit 16 can serve these different functions, parts of the cooling unit 16 may operate at all times as required while other parts can be shut down by one or more control systems of the vehicle.

Figure 2:
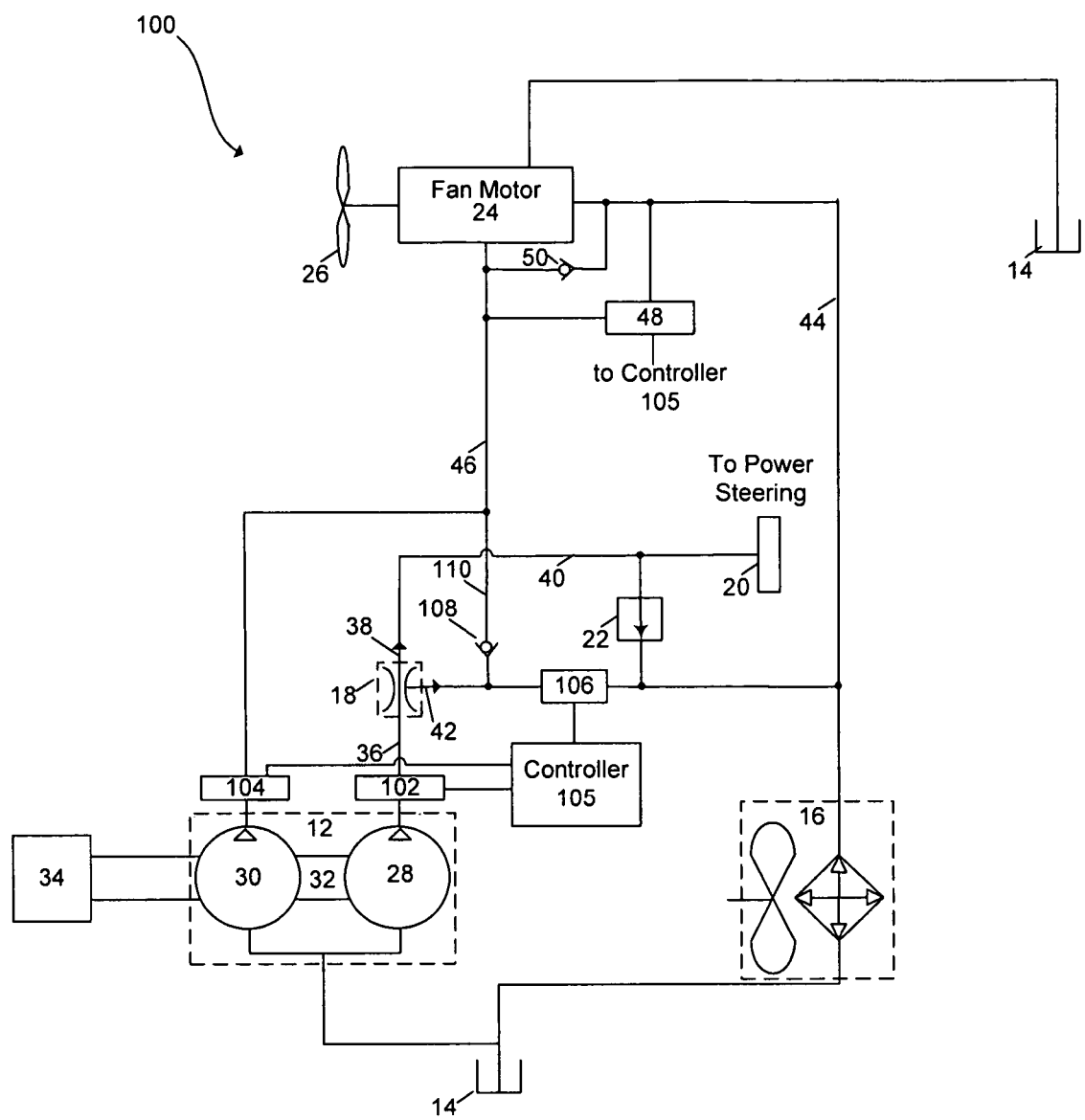
FIG. 2 is an exemplary schematic diagram of a hydraulic system in accordance with aspects of the present invention.

Referring now to FIG. 2, the hydraulic system 100 has some features and components in common with the hydraulic system 10 of FIG. 1. For the sake of clarity, the same reference numerals identified in FIG. 1 are used to identify the same or similar features and components identified in FIG. 2. Those features which differ from the hydraulic circuit and components of FIG. 1 will now be described.

Referring to FIG. 2, the prior art hydraulic fan circuit shown in FIG. 1 has been modified by including pressure transducers 102 and 104, a valve 106 and a check valve 108. Pressure transducers 102 and 104 are located at the outlet of pumps 28 and 30, respectively. Pressure transducers 102 and 104 convert pressure at the output of the pumps 28 and 30, respectively, into an electrical signal. The electrical signals output from the pressure transducers 102 and 104 are sent to a controller 105 in order to determine the horsepower output from each of the pumps 28 and 30. The controller 105 is generally capable of controlling various components of the hydraulic system 100 in order to obtain the functionality described herein. The controller 105 may receive input signals and output control signals based on the received signals. The controller 105 may be a dedicated controller or a shared controller as part of a hydraulic control system.

The pressure transducers 102 and 104 operate in conjunction with proportional relief valve 48 as a horsepower limiting circuit. For example, based on the horsepower output from each of the pumps 28 and 30 a total output horsepower value is calculated by the controller. The controller 105 sends a signal (e.g., an electrical signal) to the proportional relief valve 48 that adjusts the inlet hydraulic pressure to the fan motor 24.

For example, if the fan motor 24 is operating within its normal operating range and sufficient output horsepower has been detected by the controller 105 from pumps 28 and 30, the fan motor 24 maintains operation within its normal operating range. If the detected output horsepower from pumps 28 and 30 is decreasing, the controller 105 sends a signal to the proportional relief valve 48 to reduce the hydraulic fluid pressure supplied to the fan motor 24. Likewise, if the detected output horsepower from pumps 28 and 30 is increasing and the fan motor 24 is not operating at or above its normal operating range, the controller 105 may send a signal to the proportional relief valve 48 to increase the hydraulic fluid supplied to the fan motor 24. Accordingly, the controller 105 utilizing information from the pressure transducers 102 and 104 transmits one or more control signals to the proportion relief valve 48 in order to limit the input horsepower to the pumps 28 and 30 based, at least in part, on the outlet pressure of pumps 28 and 30.

The valve 106 may be any suitable valve. The valve 106 may be a solenoid valve or other suitable valve that may be electronically and/or mechanically controlled. In the embodiment shown in FIG. 2, the valve 106 is electronically controllable by one or more of the vehicle's control systems. The control system may be a dedicated control system or a shared control system.

The operation of the valve 106 will now be discussed. At low engine speeds, for example at engines operating at speeds less than about 1500 RPM, the valve 106 is in a closed state. When the valve 106 is in a closed state, hydraulic fluid is prevented from flowing back to the hydraulic fluid reservoir 14 through the valve 106. Instead, the hydraulic fluid is transferred to the cooling fan motor 24 along hydraulic fluid lines 110 and 46. By re-routing the excess hydraulic fluid to the cooling fan motor 24, instead of allowing the hydraulic fluid to flow to the hydraulic fluid reservoir 14, less input horsepower is needed for the hydraulic pump unit 12.

At a predetermined engine speed, for example at engines operating at a speed at or above about 1500 RPM, a controller 105 will transmit an electric signal to the valve 106, which will cause the valve 106 to open. In its open state, hydraulic fluid from secondary output 42 of the priority valve 18 will flow back to the hydraulic fluid reservoir 14 through the valve 106 and the cooling unit 16. The predetermined engine speed may be a constant speed or a variable speed. Thus, as the hydraulic pressure increases to at or above the predetermined engine speed and valve 106 opens leading hydraulic fluid from the secondary output 42 to flow to the hydraulic reservoir 14, the hydraulic pressure on the proportional relief valve 48 decreases, which ensures input horsepower will be less than the capabilities of the fan motor 24.

Generally, once an optimized speed is determined, the valve 106 may be controlled based upon the optimized speed. One of ordinary skill will readily appreciate that the predetermined engine speed will vary based upon a number of operating parameters including: the engine, the hydraulic pump unit, the demands of the hydraulic subsystems, etc. Accordingly, the predetermined speed provided above is exemplary and not intended to limit the scope of the present invention.

Valve 108 generally prevents hydraulic fluid pumped from the second pump 30 from also flowing to the fluidic fluid reservoir 14 when the valve 106 is in an open state. When valve 108 is closed, substantially all hydraulic fluid output from the second pump 30 is supplied to the fan motor 24, which powers the cooling fan 26.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydraulic system for use in an associated vehicle having a power steering system comprising:
   a hydraulic pump unit including first and second fixed displacement pumps and a common drive shaft to drive each of the pumps;
   a priority valve having an input fluidly connected to the hydraulic pump, a primary output and a secondary output, wherein the primary output is fluidly connected to the power steering system of the associated vehicle to provide a substantially constant flow of hydraulic fluid to the power steering system, and wherein the secondary output is selectably fluidly connected to a hydraulic motor for a cooling fan of the associated vehicle, wherein the secondary output of hydraulic fluid is selectably fluidly connected to the hydraulic motor based at least in part on a predetermined engine speed.

2. A hydraulic system for use in a vehicle having a power steering system comprising:
   a hydraulic pump unit including first and second fixed displacement pumps and a common drive shaft to drive each of the pumps;
   a priority valve having an input fluidly connected to the hydraulic pump, a primary output and a secondary output, wherein the primary output is fluidly connected to the power steering system of the associated vehicle to provide a substantially constant flow of hydraulic fluid to the power steering system, and wherein the secondary output is selectably fluidly connected to a hydraulic motor for a cooling fan of the associated vehicle; and a controller that receives at least one signal from one or more pressure transducers fluidly coupled to the hydraulic pump unit.

3. The system of claim 2, wherein the controller outputs a control signal to a relief valve having a first end in fluid communication with at least one of the first and second fixed displacement pumps.

4. The system of claim 3, wherein the control signal is based at least on an outlet pressure associated with at least one of the first and second fixed displacement pumps.

5. A hydraulic system for use in an associated vehicle having a power steering system comprising:
　a hydraulic pump unit including first and second fixed displacement pumps and a common drive shaft to drive each of the pumps;
　a priority valve having an input fluidly connected to the hydraulic pump, a primary output and a secondary output, wherein the primary output is fluidly connected to the power steering system of the associated vehicle to provide a substantially constant flow of hydraulic fluid to the power steering system, and wherein the secondary output is selectably fluidly connected to a hydraulic motor for a cooling fan of the associated vehicle; and
　a valve fluidly connected between the secondary output of the priority valve and a hydraulic reservoir, wherein the hydraulic fluid reservoir is fluidly connected to at least one inlet of the pumps.

6. The system of claim 5, wherein the valve is operable by a controller that outputs an electrical signal to open and/or close the valve.

7. The system of claim 5, wherein the controller outputs the electrical signal based at least in part on the engine speed of the associated vehicle.

8. The system of claim 5, wherein the valve is a solenoid valve.

9. The system of claim 5 further including a check valve having a first end fluidly connected between the secondary output of the priority valve and the valve and a second end fluidly connected to the hydraulic motor for the cooling fan.

10. The system of claim 9, wherein the check valve is operable to maintain hydraulic pressure to the hydraulic motor for the cooling fan when the valve is an open position.

11. A method for increasing fan speed in a hydraulic system of an associated vehicle having a power steering system, the method comprising:
　driving first and second fixed displacement pumps having a common drive shaft to each of the pumps with an associated engine;
　fluidly connecting a priority valve having an outlet of at least one of the first and second pumps, wherein the priority valve includes a primary output and a secondary output, wherein the primary output is fluidly connected to the power steering system of the associated vehicle to provide a substantially constant flow of hydraulic fluid to the power steering system, and wherein the secondary output is selectably fluidly connected to a hydraulic motor for a cooling fan of the associated vehicle; and
　selectably fluidly connecting the secondary output of the priority valve to the hydraulic motor based at least in part on a predetermined engine speed.

12. A method for increasing fan speed in a hydraulic system of a vehicle having a power steering system, the method comprising:
　driving first and second fixed displacement pumps having a common drive shaft to each of the pumps with an associated engine;
　fluidly connecting a priority valve having an outlet of at least one of the first and second pumps, wherein the priority valve includes a primary output and a secondary output, wherein the primary output is fluidly connected to the power steering system of an associated vehicle to provide a substantially constant flow of hydraulic fluid to the power steering system, and wherein the secondary output is selectably fluidly connected to a hydraulic motor for a cooling fan of the associated vehicle; and
　fluidly connecting a valve between the secondary output of the priority valve and a hydraulic fluid reservoir, wherein the hydraulic fluid reservoir is fluidly connected to at least one inlet of the pumps.

13. The method of claim 12 further including controlling the valve by a controller that outputs an electrical signal to open and/or close the valve.

14. The method of claim 13, wherein the controller outputs the electrical signal based at least in part on the engine speed of the associated vehicle.

15. The method of claim 14, wherein the valve is a solenoid valve.

16. The method of claim 12 further including fluidly connecting a first end of a check valve between the secondary output of the priority valve and the valve and fluidly connecting a second end of the check valve to the hydraulic motor for the cooling fan.

17. The system method of claim 16, wherein the check valve maintains hydraulic pressure to the hydraulic motor for the cooling fan when the valve is an open position.

18. A hydraulic system for use in an associated vehicle having a power steering system, the system comprising:
　a hydraulic pump unit including first and second fixed displacement pumps and a common drive shaft to drive each of the pumps;
　priority valve having an input fluidly connected to the hydraulic pump, a primary output circuit and a secondary output circuit, wherein the primary output circuit provides hydraulic fluid to the power steering system of an associated vehicle, and wherein the secondary output circuit provides hydraulic fluid to a hydraulic motor for a cooling fan of the associated vehicle when the vehicle engine speed is substantially at or below a predetermined speed, wherein the secondary output circuit routes the hydraulic fluid to a hydraulic fluid reservoir when vehicle engine speed is above the predetermined speed, wherein the hydraulic fluid reservoir is fluidly connected to at least one inlet of the pumps.

19. The system of claim 18 further including a valve fluidly connected between the secondary output of the priority valve and the reservoir.

20. The system of claim 19 further including a controller that outputs an electrical signal to open and/or close the valve.

21. The system of claim 18 further including a check valve having a first end fluidly connected between the secondary output of the priority valve and the valve and a second end fluidly connected to the hydraulic motor for the cooling fan, wherein the check valve is operable to maintain hydraulic pressure to the hydraulic motor for the cooling fan when the valve is an open position.

22. A method for limiting input horsepower, the method comprising:

driving first and second fixed displacement pumps having a common drive shaft to each of the pumps with an associated engine;

sensing hydraulic pressure output from each of the first and second displacement pumps with at least one pressure transducer;

outputting a signal form the at least one pressure transducer to a controller;

controlling a proportional pressure relief valve having a first end fluidly connected to a fan motor; wherein the proportional pressure relief valve limits hydraulic pressure supplied to the fan motor based at least in part on hydraulic pressure output from each of the first and second displacement pumps.

* * * * *